(12) United States Patent
Fyke et al.

(10) Patent No.: US 9,208,583 B2
(45) Date of Patent: Dec. 8, 2015

(54) DEVICE WITH ENHANCED AUGMENTED REALITY FUNCTIONALITY

(71) Applicant: RESEARCH IN MOTION LIMITED, Waterloo (CA)

(72) Inventors: Steven Henry Fyke, Waterloo (CA); David Ryan Walker, Waterloo (CA); Donald Somerset McCulloch McKenzie, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 333 days.

(21) Appl. No.: 13/765,979

(22) Filed: Feb. 13, 2013

(65) Prior Publication Data

US 2014/0225898 A1 Aug. 14, 2014

(51) Int. Cl.
*G06T 19/00* (2011.01)
*G06T 11/00* (2006.01)
*G06T 13/80* (2011.01)

(52) U.S. Cl.
CPC ............... *G06T 11/00* (2013.01); *G06T 13/80* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 2008/0157946 A1* | 7/2008 | Eberl et al. | 340/435 |
| 2009/0110245 A1 | 4/2009 | Thron | |
| 2010/0238161 A1* | 9/2010 | Varga et al. | 345/419 |
| 2012/0069051 A1* | 3/2012 | Hagbi et al. | 345/633 |
| 2012/0256917 A1 | 10/2012 | Lieberman et al. | |
| 2012/0272171 A1 | 10/2012 | Icho et al. | |

FOREIGN PATENT DOCUMENTS

| | | |
|---|---|---|
| EP | 1748368 A1 | 1/2007 |
| WO | 2005/124594 A1 | 12/2005 |
| WO | 2006/070047 A1 | 7/2006 |

OTHER PUBLICATIONS

Rose et al., "Annotating Real-World Objects Using Augmented Reality," CG International '95 Proceedings, Leeds, UK, Jun. 1995, pp. 357-370.*
European Patent Application No. 13155125.1 Search Report dated Jul. 19, 2013; Examiner: Kroner, Sabine.

* cited by examiner

*Primary Examiner* — Kee M Tung
*Assistant Examiner* — Nicholas R Wilson
(74) *Attorney, Agent, or Firm* — Perry + Currier, Inc.

(57) ABSTRACT

A device with enhanced augmented reality functionality and methods therefor, are provided. An identifier of an object is rendered, at a display of a device, at a first position associated with the object. An object tracked device is used to track the object. When the object moves, a processor of the device smoothly transitions the identifier from the first position to a second position at the display using animation, the second position associated with a new position of the object.

15 Claims, 11 Drawing Sheets

```
┌─────────────────────────────────────┐
│ Render, At The Display, An Identifier Of An │
│ Object At A First Position Associated With  │
│ The Object, The Object Tracked, Using       │
│ The Object Tracking Device                  │
│ 201                                         │
└─────────────────────────────────────┘
                    │
                    ▼
┌─────────────────────────────────────┐
│ When The Object Moves, Smoothly             │
│ Transition The Identifier From The First    │
│ Position To A Second Position At The        │
│ Display Using Animation, The Second         │
│ Position Associated With A New Position     │
│ Of The Object                               │
│ 203                                         │
└─────────────────────────────────────┘
```

DEVICE WITH ENHANCED AUGMENTED REALITY FUNCTIONALITY

FIELD

The specification relates generally to computing devices and specifically to a device with enhanced augmented reality functionality and methods there for.

BACKGROUND

The evolution of computers is currently quite active in the mobile device environment. It is now well-known to including calendaring, contacts, and messaging functions in mobile devices. More recently, there has been a veritable explosion of the number and type of applications that are configured to the unique form factors and computing environments of mobile devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

In this specification, elements may be described as "configured to" perform one or more functions or "configured for" such functions. In general, an element that is configured to perform or configured for performing a function comprises structure for performing the function, or is enabled to perform the function, or is suitable for performing the function, or is adapted to perform the function, or is operable to perform the function, or is otherwise capable of performing the function.

In this specification, elements may be described as configured to "capture" an electronic image. In general, an element that is configured to capture an image is configured to acquire an electronic image, or obtain an electronic image, and the like.

An aspect of the specification provides a device comprising: a processor, an object tracking device and a display; the processor configured to: render, at the display, an identifier of an object at a first position associated with the object, the object tracked using the object tracking device; and, when the object moves, smoothly transition the identifier from the first position to a second position at the display using animation, the second position associated with a new position of the object.

The processor can be further configured to render, at the display, the identifier at one or more of proximal to a position associated with the object, on the position associated with the object, above the position associated with the object, below the position associated with the object, beside the position associated with the object and floating by the position associated with the object.

The identifier can comprise a pointer to the object, and the processor can be further configured to move the pointer to point towards the object when the object moves relative to the display. The pointer can continue to point towards the object as the identifier transitions to the second position.

The processor can be further configured to use one or more of spring physics and inertial physics to smoothly transition the identifier to the second position.

When the new position of the object is outside of a field of view of the display, the second position can be at an edge of the display proximal where the object moved out of the field of view. The identifier can one or more of: be removed from the display after a given time period; and identify a position of the object outside of the field of view of the display.

The processor can be further configured to: track the object when the object can no longer be rendered at the display; and indicate a position of the object via the identifier.

The object tracking device can comprise a camera for capturing electronic images of the object and the processor can be further configured to render an image of the object in the electronic images along with the identifier of the object.

The device can further comprise a heads-up display (HUD) device, wherein the display can comprise a transparent display of the HUD device, and the first position and the second position can be associated with positions of the object in a field of view of the transparent display.

Another aspect of the specification provides a method comprising: rendering, at a display of a device, an identifier of an object at a first position associated with the object, the object tracked using an object tracking device; and, when the object moves, smoothly transitioning, using a processor of the device, the identifier from the first position to a second position at the display using animation, the second position associated with a new position of the object.

The method can further comprise rendering, at the display, the identifier at one or more of proximal to a position associated with the object, on the position associated with the object, above the position associated with the object, below the position associated with the object, beside the position associated with the object and floating by the position associated with the object.

The identifier can comprise a pointer to the object, and the method can further comprise moving the pointer to point towards the object when the object moves relative to the display. The pointer can continue to point towards the object as the identifier transitions to the second position.

The method can further comprise the processor using one or more of spring physics and inertial physics to smoothly transition the identifier to the second position.

The new position of the object can be outside of a field of view of the display, and the second position can be at an edge of the display proximal where the object moved out of the field of view. The identifier can one or more of: be removed from the display after a given time period; and identify a position of the object outside of the field of view of the display.

The method can further comprise: tracking the object when the object can no longer be rendered at the display; and indicating a position of the object via the identifier.

The object tracking device can comprise a camera for capturing electronic images of the object and the method can further comprise rendering an image of the object in the electronic images along with the identifier of the object.

The display can comprise a transparent display of a heads-up display (HUD) device, and the first position and the second position can be associated with positions of the object in a field of view of the transparent display.

Yet a further aspect of the specification provides a computer program product, comprising a computer usable medium having a computer readable program code adapted to be executed to implement a method comprising: rendering, at a display of a device, an identifier of an object at a first position associated with the object, the object tracked using an object tracking device; and, when the object moves, smoothly transitioning, using a processor of the device, the identifier from the first position to a second position at the display using animation, the second position associated with a new position of the object. The computer usable medium can comprise a non-transitory computer usable medium.

Figure 1:
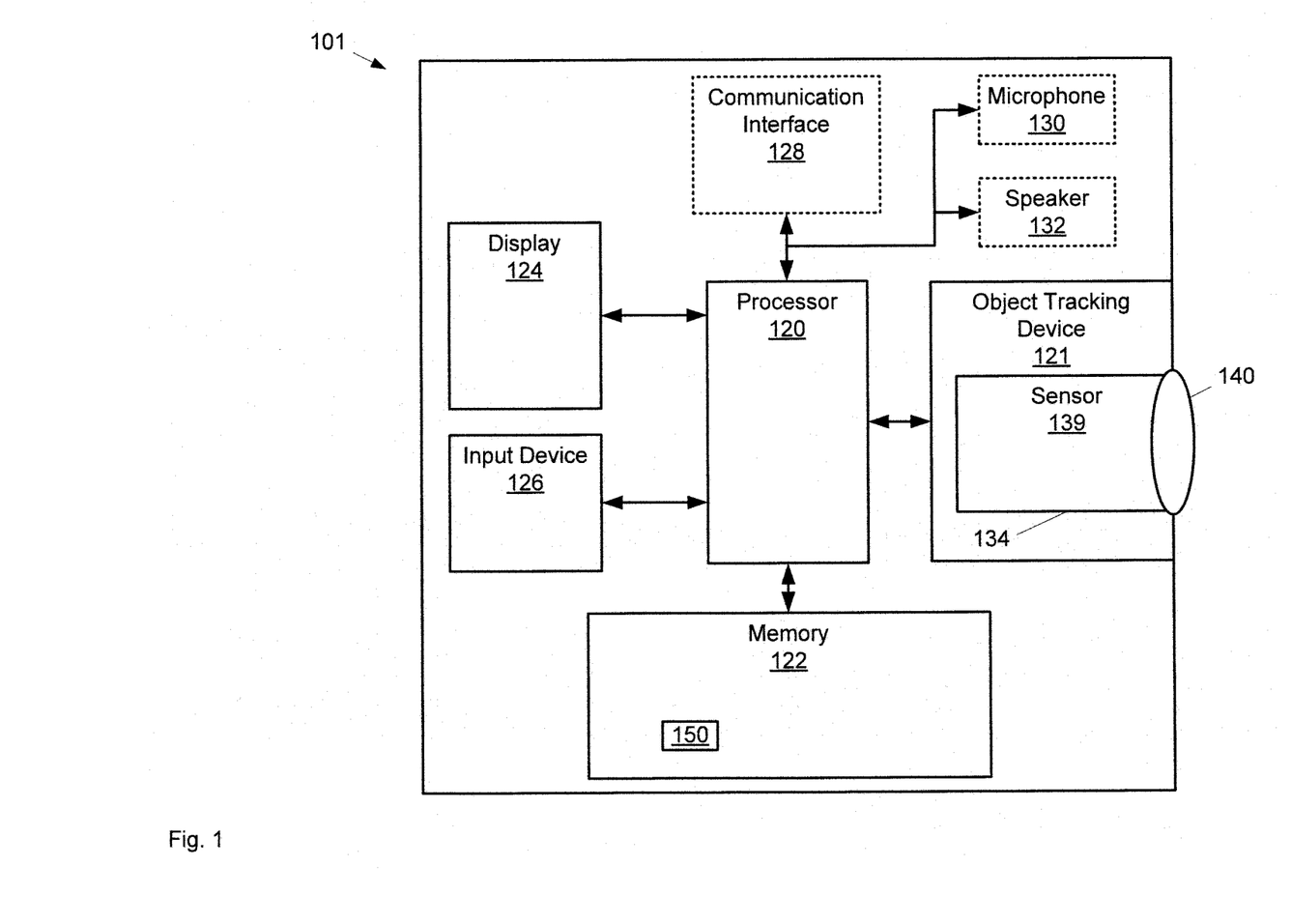
FIG. 1 depicts a schematic diagram of a device with enhanced augmented reality functionality, according to non-limiting implementations.

FIG. 1 depicts a device 101 with enhanced augmented reality functionality, according to non-limiting implementations. Device 101 comprises: a processor 120 interconnected with an object tracking device 121, a memory 122, a display 124, an input device 126, and an optional communication interface 128, an optional microphone 130 and an optional speaker 132. In implementations depicted in FIG. 1, object tracking device 121 comprises a camera device 134 such that a position of an object in a field of view of camera device 134 can be determined. In depicted implementations, display 124 is configured to render electronic images captured by camera device 134. Processor 120 is configured to: render, at display 124, an identifier of an object at a first position associated with the object, the object tracked using the object tracking device 121; and, when the object moves, smoothly transition the identifier from the first position to a second position at display 124 using animation, the second position associated with a new position of the object.

While in depicted implementations of FIG. 1, object tracking device 121 comprises camera 134, object tracking device 121 can comprise any tracking device for tracking a position of an object, including, but not limited to, tracking a position of an object that is outside a field of view of camera device 134. For example, tracking device 121 can comprise one or more of a second camera device, a wireless device in communication with communication apparatus at an object, a wireless device in communication with an external device tracking a position of an object, a triangulation device, a Global Positioning System (GPS) device, and the like.

Camera device 134 is configured to capture at least one electronic image and comprises a sensor 139 for capturing at least one electronic image and a lens system 140 for focusing light onto sensor 139, the focused light sensed by sensor 139 for capturing electronic images. Sensor 139 of camera device 134 generally comprises any device for acquiring electronic images, including but not limited one or more of an electronic camera, an electronic video camera, a CMOS (complementary metal-oxide-semiconductor) image sensor, a CCD (charge-coupled device) image sensor and the like.

Lens system 140 can comprise one or more lenses and, optionally, a focusing mechanism. In some implementations, lens system 140 can be modular and/or interchangeable, such that various lenses can be used with device 101. In other implementations, lens system 140 can be fixed but focusable via focusing mechanism. In yet further implementations camera device 134 comprises a sensor module and/or a camera module comprising sensor 139 and lens system 140.

Device 101 can be any type of electronic device that can be used in a self-contained manner to capture electronic images via camera device 134. Device 101 includes, but is not limited to, any combination of digital cameras, electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-configured appliances and the like.

As will be explained in further detail below, memory 122 stores an augmented reality application 150 which, when processed by processor 120, enables device 101 to capture electronic images of a field of view of camera device 134, render the electronic images at display 124, identify objects in the electronic images, and label and/or identify the objects in the electronic images when rendered at display 124. For example, device 101 can be configured to capture a video stream of an area of a city, and the like, and identify objects such as businesses, transit stops, people, taxis, etc. in the video stream, using one or more of object recognition routines, facial recognition routines, a global positioning system (not depicted), a location server, an augmented reality server (e.g. device 101 can be in communication with a location server and/or an augmented reality server via communication interface 128, neither of which), and the like. Hence, objects in the electronic images rendered at display 124 are identified. This identification is generally referred to as augmented reality.

It is appreciated that FIG. 1 further depicts a schematic diagram of device 101 according to non-limiting implementations. It should be emphasized that the structure of device 101 in FIG. 1 is purely an example, and contemplates a device that can be used for acquiring electronic images, wireless voice (e.g. telephony) and wireless data communications (e.g. email, web browsing, text, and the like). However, while FIG. 1 contemplates a device that can be used for both camera functionality and telephony, in other implementations, device 101 can comprise a device configured for implementing any suitable specialized functions, including but not limited to one or more of camera functionality, telephony, computing, appliance, and/or entertainment related functions.

Device 101 comprises at least one input device 126 generally configured to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Input from input device 126 is received at processor 120 (which can be implemented as a plurality of processors, including but not limited to one or more central processors (CPUs)). Processor 120 is configured to communicate with memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art recognize that memory 122 is an example of computer readable media that can store programming instructions executable on processor 120. Furthermore, memory 122 is also an example of a memory unit and/or memory module.

In particular, it is appreciated that memory 122 stores at least one application 150, that, when processed by processor 120, enables processor 120 to render, at display 124, an identifier of an object at a first position associated with the object, the object tracked using the object tracking device 121; and, when the object moves, smoothly transition the identifier from the first position to a second position at display 124 using animation, the second position associated with a new position of the object. It is yet further appreciated that at least one application 150 is an example of programming instructions stored at memory 122.

As best understood from FIG. 3, described below, in present implementations, object tracking device 121 is configured, using camera device 134, to capture electronic images from a field of view facing away from the rear of device 101. However, the placement and/or field of view of camera device 134 are generally non-limiting: for example, camera device 134 could be located to capture images in a field of view adjacent display 124. Indeed, in some implementations, device 101 can comprise more than one camera device 134 and/or more than one sensor similar to sensor 139 and/or more than one lens system similar to lens system 140, for acquiring images at more than one field of view. Further, images captured by camera device 134 can comprise one or more of camera images, video images, video streams and the like.

It is yet further appreciated that, in some implementations, camera device 134 can comprise an infrared sensor such that images comprise electronic infrared images and hence camera device 134 can function in low ambient lighting scenarios.

In addition to one or more lenses, lens system 140 can comprise a focussing mechanism for changing the focal plane of camera device 134, including, but not limited to, any combination of voice coil actuators, piezoelectric motors, stepper motors, and the like.

Furthermore, object tracking device 121 is not limited to camera devices 134 and any suitable object tracking device can be used to track a position of an object, including, but not limited to a wireless device in communication with communication apparatus at an object, a wireless device in communication with an external device tracking a position of an object, a triangulation device, a Global Positioning System (GPS) device, and the like.

Processor 120 can also be configured to communicate with display 124, and optionally microphone 130 and a speaker 132. Display 124 comprises any suitable one of or combination of CRT (cathode ray tube) and/or flat panel displays (e.g. LCD (liquid crystal display), plasma, OLED (organic light emitting diode), capacitive or resistive touch screens, and the like). When display 124 comprises a touch screen, it is appreciated that display 124 and input device 126 can be combined into one apparatus. While optional, microphone 130 is configured to receive sound data, and speaker 132 is configured to provide sound data, audible alerts, audible communications, and the like, at device 101. In some implementations, input device 126 and display 124 are external to device 101, with processor 120 in communication with each of input device 126 and display 124 via a suitable connection and/or link.

In optional implementations, as depicted, processor 120 also connects to communication interface 128, which is implemented as one or more radios and/or connectors and/or network adaptors, configured to wirelessly communicate with one or more communication networks (not depicted). It will be appreciated that, in these implementations, communication interface 128 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When communication interface 128 is configured to communicate with one or more communication networks, communication interface 128 can comprise further protocol specific antennas there for (not depicted).

While not depicted, it is further appreciated that device 101 further comprises one or more power sources, including but not limited to a battery and/or a connection to an external power source, including, but not limited to, a main power supply.

In any event, it should be understood that in general a wide variety of configurations for device 101 are contemplated.

It is further appreciated that, processing resources at device 101 can be limited, especially when device 101 comprises a mobile device. It is further appreciated that, when application 150 is implemented to render an augmented reality view of electronic images captured by camera device 134, as the objects move (e.g. due to movement of one or more of the objects and device 101, and/or due to movement of device 101 relative to the objects), the position of the identifiers must be updated; however, in mobile devices, processing resources are generally limited and there can be lag between positions of the labels and the position of the object itself, hence the identifier appears to jump suddenly from one position to another.

Figure 2:
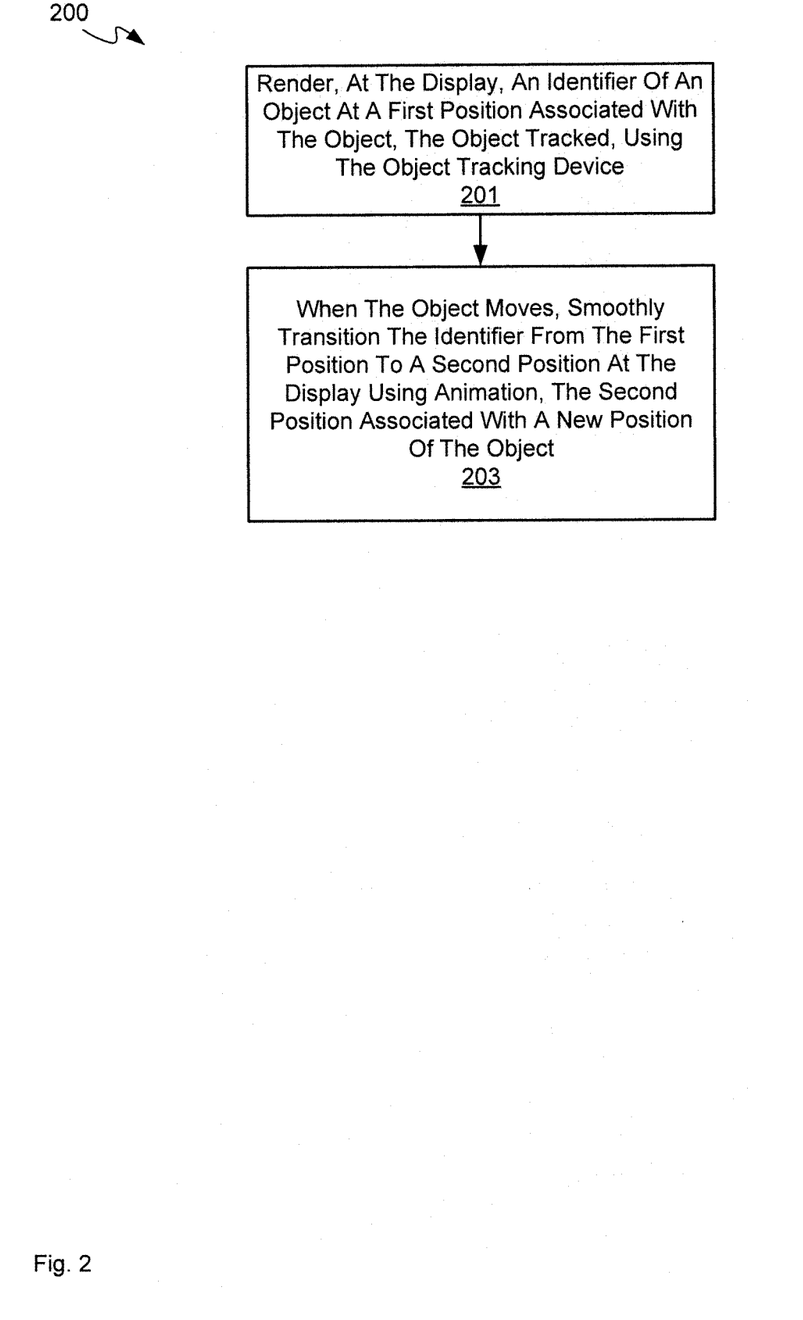
FIG. 2 depicts a schematic diagram of a flow chart of a method for providing enhanced augmented reality functionality, according to non-limiting implementations.

Attention is now directed to FIG. 2 which depicts a flowchart illustrating a method 200 for implementing enhanced augmented reality functionality at a device, according to non-limiting implementations, which generally addresses this problem. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present implementations. It is appreciated that, in some implementations, method 200 is implemented in device 101 by processor 120.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of device 101 as well.

At block 201, processor 120 render, at display 124, an identifier of an object at a first position associated with the object, the object tracked, using object tracking device 121. At block 203, processor 120, when the object moves in the electronic images, smoothly transitions the identifier from the first position to a second position at display 124 using animation, the second position associated with a new position of the object in the electronic images.

Non-limiting examples of method 200 will now be described with reference to FIGS. 3 to 8. In particular, as will be described below, each of FIGS. 4 to 8 depict modes of application 150: for example, a given mode of application 150 can be selected via one or more of input device 126, a menu, a pull-down menu, and the like, however it is appreciated that, in some implementations, application 150 can be operated in only one mode, and that other modes can be optional.

Figure 3:
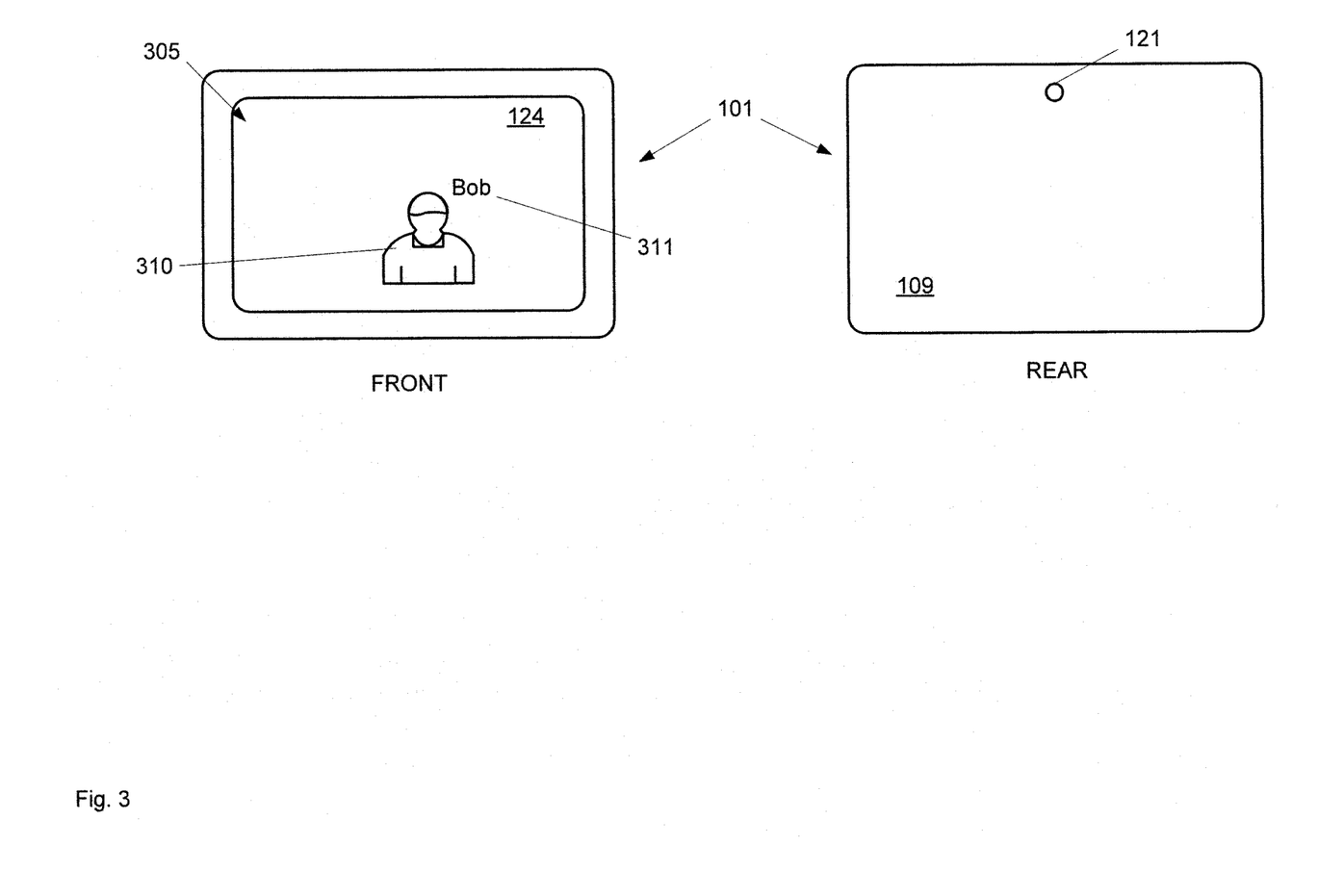
FIG. 3 depicts front and rear perspective views of the device of FIG. 1, according to non-limiting implementations.

FIG. 3 depicts front and rear perspective views of device 101, according to non-limiting implementations. From FIG. 3, it is apparent that camera device 134 is configured to capture electronic images 305 of a field of view at a rear of device 101. It is further apparent that device 101 is in an augmented reality mode such that electronic images 305 captured by camera device 134 are rendered at display 124, including an object 310 and an identifier 311. Further, while present implementations are described with reference to one object 310, present implementations are not so limited can include any number of objects 310 in a field of view of camera device 134 and/or a field of view of display 124.

It is further appreciated that only an external portion of camera device 134 is depicted in FIG. 3, for example one or more lenses of lens system 140.

It is appreciated that identifier 311 is provided once object 310 has been identified. Processor can be further configured to render, at display 124 identifier 311 at one or more of proximal to a position associated with object 310, on a position associated with object 310, above a position associated with object 310, below a position associated with object 310, beside a position associated with object 310 and floating by a position associated with object 310. In depicted non-limiting implementations, identifier 311 is rendered above and to the right of a position associated with object 310. However, a position of identifier 311 can be controlled based on a selected mode and/or configuration of application 150.

It is further appreciated that, in FIG. 3, object 310 has not yet moved relative to display 124 and/or display 124 has not yet moved relative to object 310, and identifier 311 is located at a first position.

Figure 7:
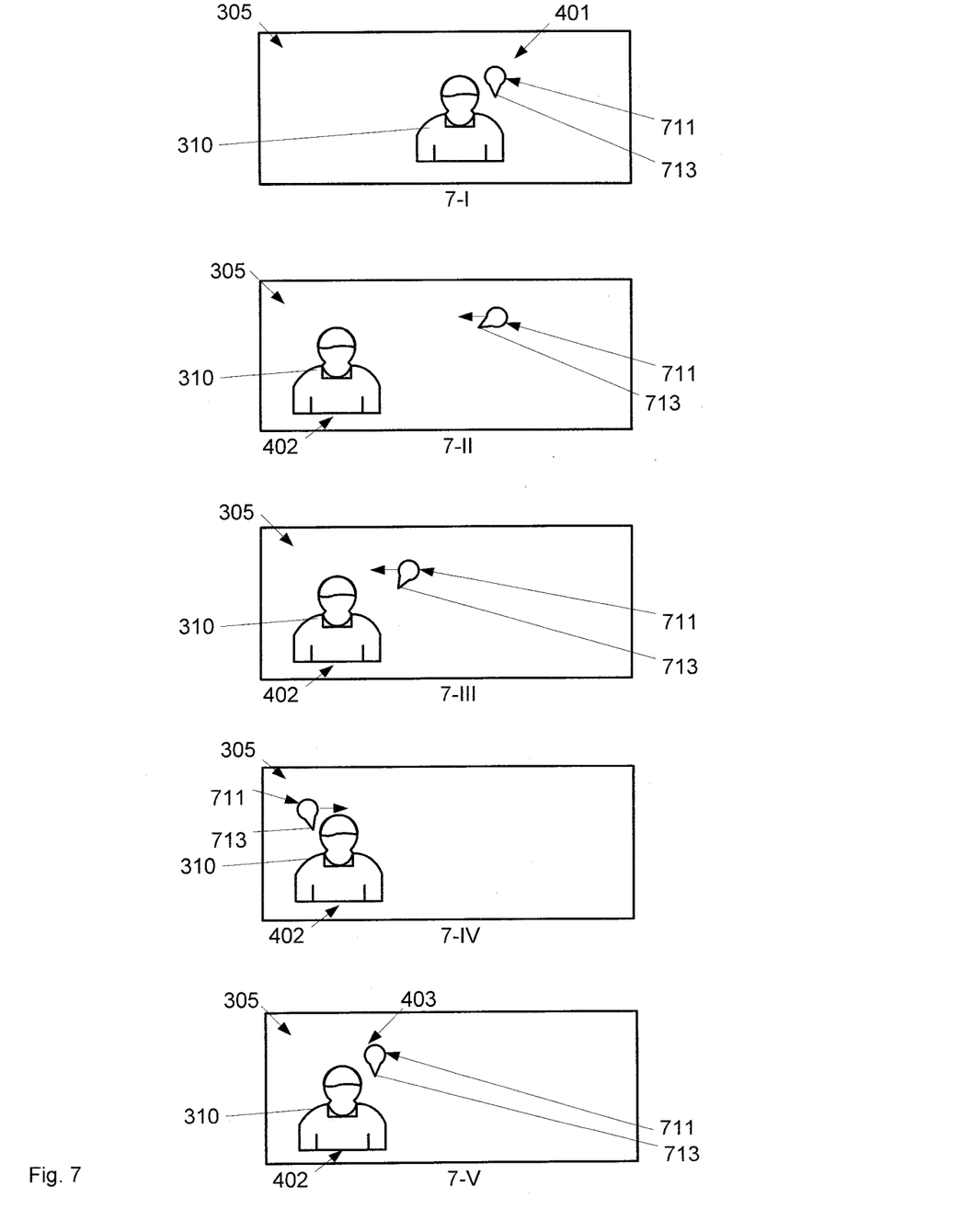
FIG. 7 depicts an animation sequence at a graphic user interface of an enhanced augmented reality application at the device of FIG. 1, with a graphical identifier of an object, the graphical identifier including a pointer, according to non-limiting implementations.
Figure 8:
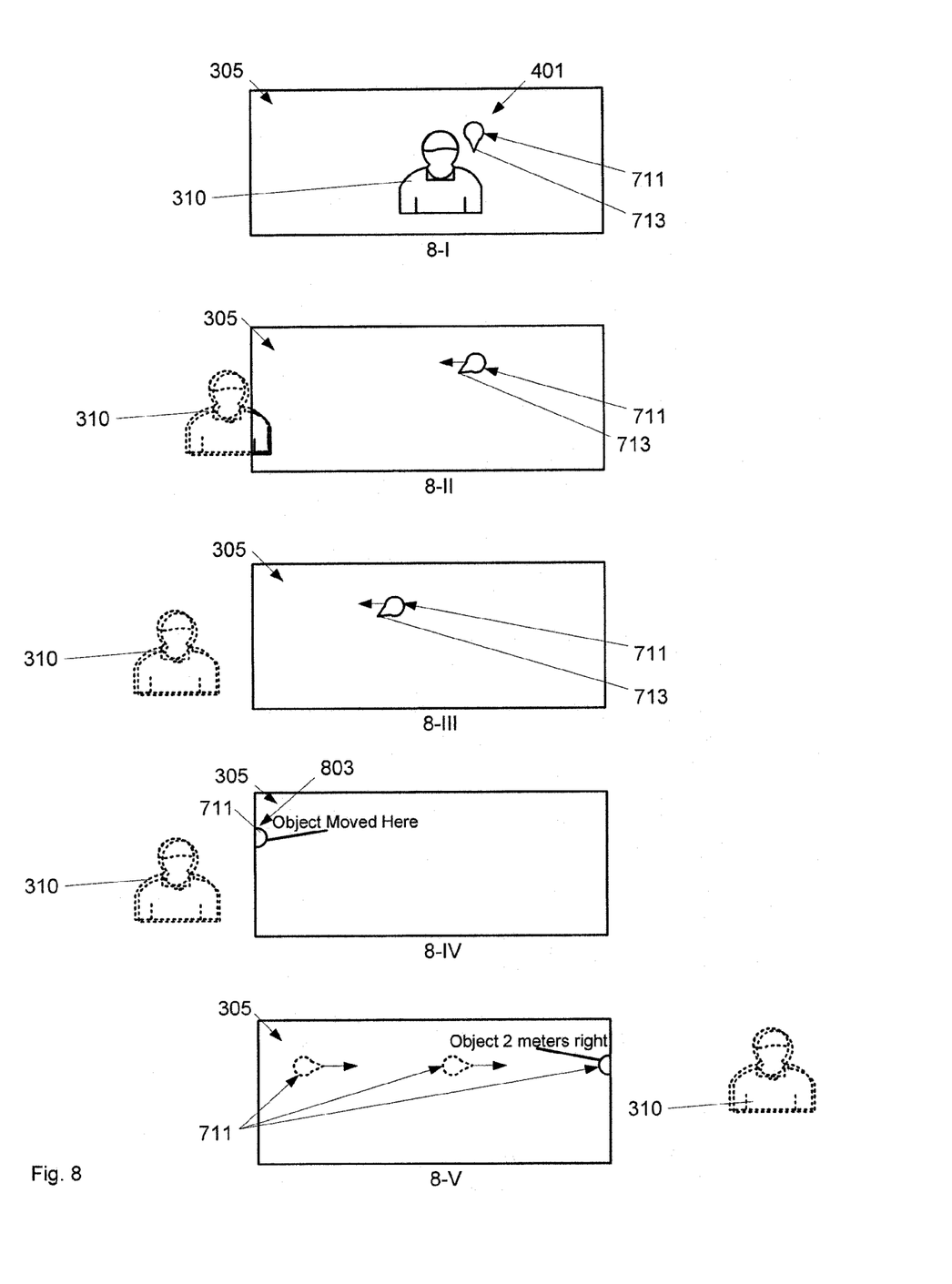
FIG. 8 depicts an animation sequence at a graphic user interface of an enhanced augmented reality application at the device of FIG. 1, where an object moves out of a field of view of a camera device, according to non-limiting implementations.

Further, while in depicted implementations, identifier 311 comprises textual identifier (i.e. "Bob"), in other implementations, identifier can comprise a graphic identifier (e.g. as depicted in FIGS. 7 and 8, described below), a combination of a graphic identifier and textual identifier and the like. Indeed, the textual and/or graphical aspects of identifier 311 can be based on a selected mode of application 150. For example, a graphical identifier could comprise a dot, a circle, a square, and the like, which identifies object 310 as a person known to a user of device 101. In implementations where an object 310 comprise one or more persons, processor 120 can be configured to identify object 310 using facial recognition routines and/or compare object 310 against a database of known objects and/or known persons, which can be stored at memory 122 and/or at a server in communication with device 101 via communication interface 128.

Figure 4:
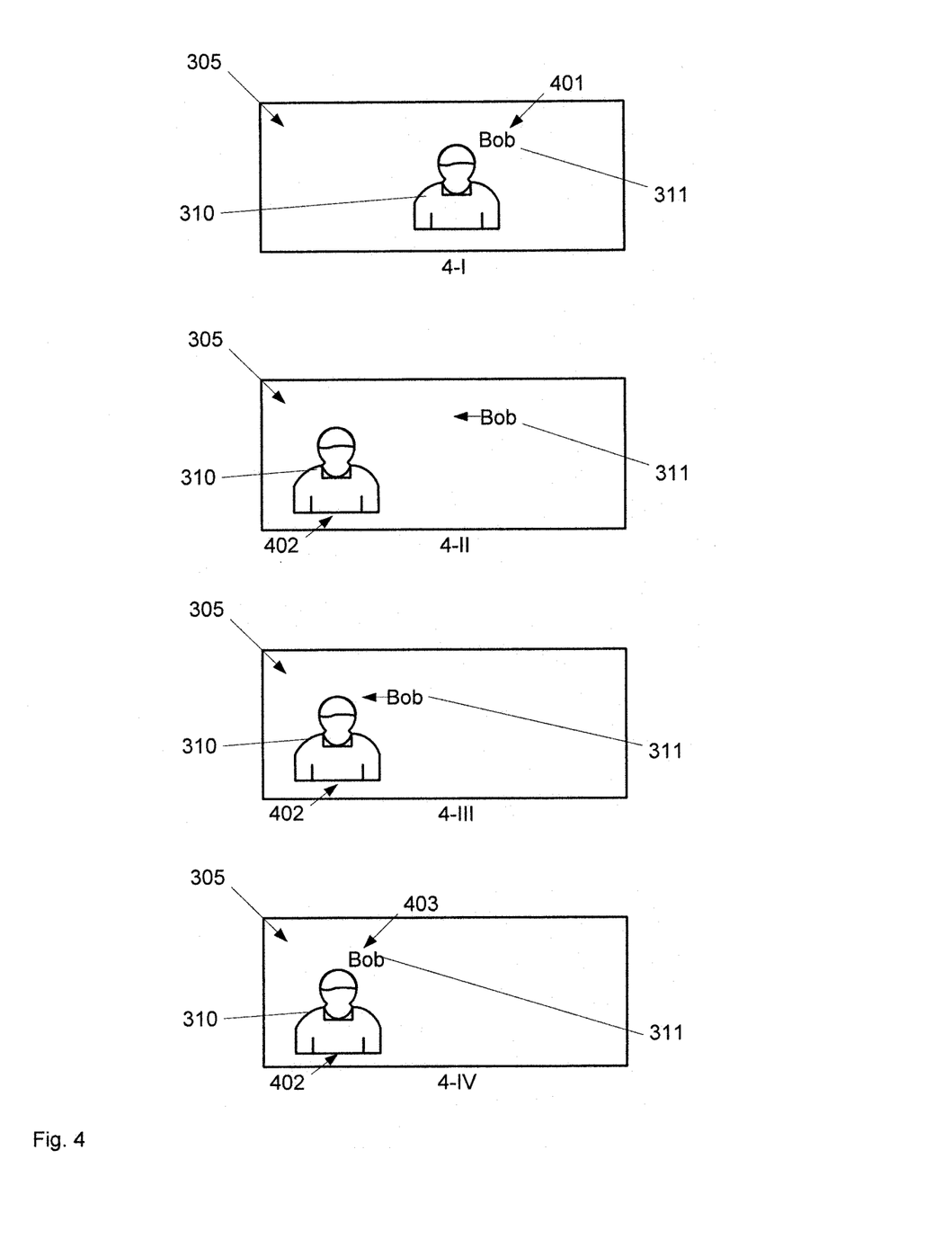
FIG. 4 depicts an animation sequence at a graphic user interface of an enhanced augmented reality application at the device of FIG. 1, with a textual identifier of an object, according to non-limiting implementations.

In any event, attention is next directed to FIG. 4 which depicts frames of an animation sequence of a graphic user interface (GUI) of electronic images 305 rendered at display 124 as object 310 moves therein, and/or as object 310 moves relative to device 101 and/or as device 101 moves relative to object 310, in a given mode of application 150. For example, frame 4-I of FIG. 4 is similar to the view rendered in FIG. 3, wherein object 310 is at an initial position and identifier 311 is at a first position 401.

At frame 4-II, object 310 has moved to a new position 402 in electronic images 305 and/or relative to display 124 and/or in a field of view of camera device 134 and/or in a field of view of display 124: as depicted, object 310 has moved to proximal a left edge of display 124. As processor 120 can take time to determine a second position 403 of identifier 311, identifier 311 is still located at the first position 401. In other words, at frame 4-II, identifier 311 persists at first position 4-II.

At frame 4-III, object 310 remains at new position 402, but identifier 311 has started to smoothly transition from the first position 401 to a second position 403, associated with new position 402 of object 310 (e.g. a similar position to first position 401 relative to object 310), using animation, and is located at a position intermediate, first position 401 and second position 403. In other words, at frame 4-III, processor 120 has determined new position 402.

At frame 4-IV, identifier 311 has smoothly transitioned to second position 403, which is similar to the first position 401 relative to object 310 (e.g., above and to the right).

In FIG. 4, it is appreciated that each of frames 4-I to 4-II represent frames from an animated sequence: in other words, identifier 311 does not suddenly jump from first position 401 in frame 4-I to the intermediate positions in frames 4-II to second position 403 in frame 4-IV. Rather, identifier 311 smoothly moves from first position 401 to second position 403, as represented by the arrows in frame 4-II, 4-III extending from identifier 311.

It is further appreciated that identifier 311 can begin to smoothly transition from a first position to a second position while object 310 is located at a new intermediate position that is not a final position; in other words, a position of object 310 need not be static within display 124, and identifier 311 can smoothly transition from a first position to a second position, and then to a third position and/or further positions, based on a position of object 310. In other words, identifier 311 can smoothly follow object 310 as object 310 moves relative to display 124 and/or as display 124 moves relative to object 310.

Processor 120 can be further configured to use spring physics to smoothly transition identifier 311 to second position 403. For example, attention is next directed to FIG. 5, which depicts another given mode of application 150, and specifically frames 5-I, 5-II, 5-III, 5-IV of an animation sequence which are respectively similar frames 4-I, 4-II, 4-III, 4-IV of FIG. 4, with like elements having like numbers. However, each view in FIG. 5 further depicts a spring 501 joining object 310 and identifier 311. It is appreciated that spring 501 is neither rendered nor present; rather spring 501 comprises a hypothetical spring joining object 310 and identifier 311 used to determine movement of identifier 311 in electronic images 305, presuming spring 501 acts to move only identifier 311. In other words, a position of object 310 is determined by processor 120 determining a position of object 310 at display 124, but a position of identifier 311 is determined by spring 501 acting on identifier 311.

Figure 5:
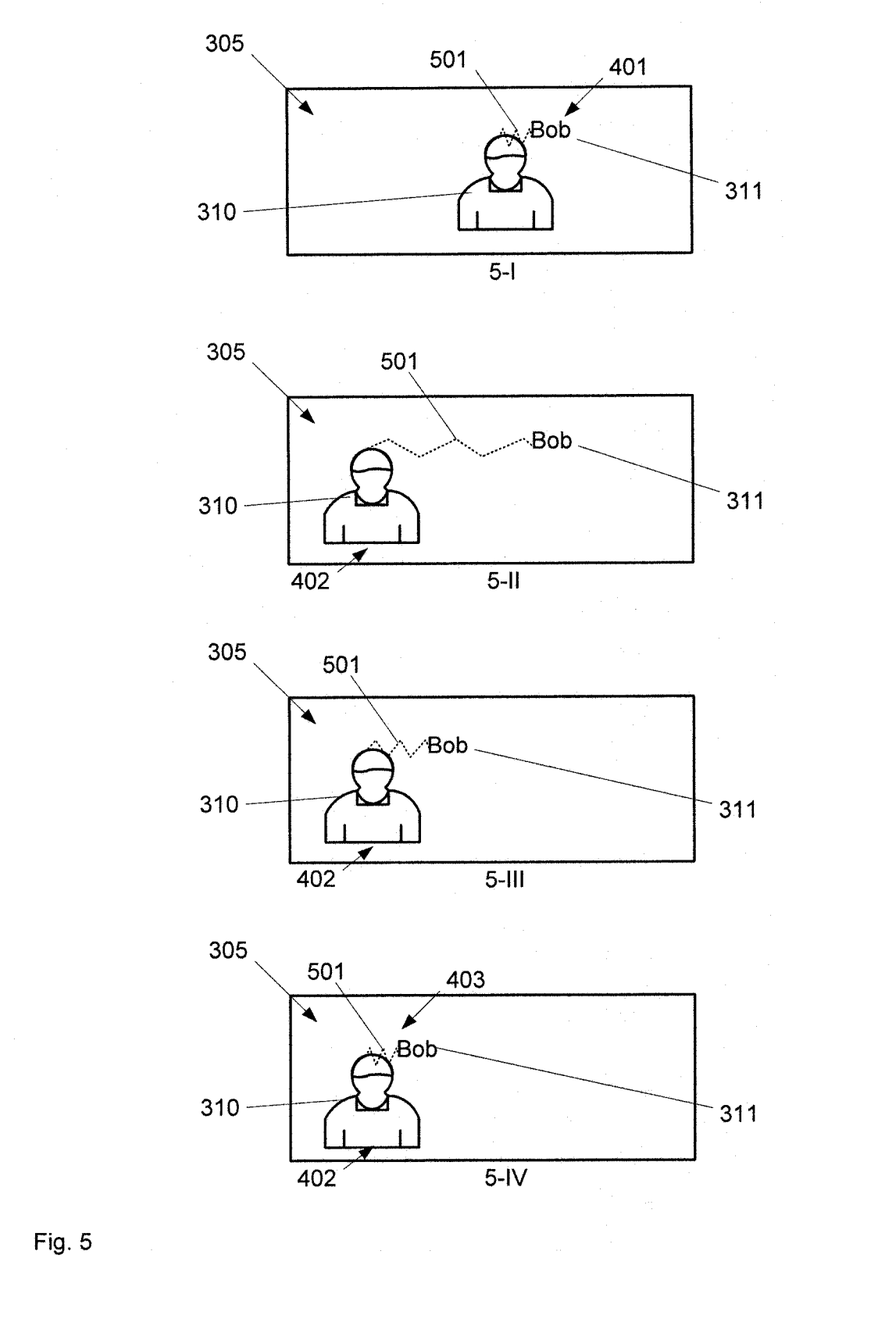
FIG. 5 depicts the animation sequence of FIG. 4, with a spring connecting the textual identifier and the object, to illustrate use of spring physics to animate the identifier according to non-limiting implementations.

For example spring 501 can behave according to Hooke's law f=−kx, wherein "F" comprises a restoring force on identifier 311, "x" comprises a displacement of spring 501 from an equilibrium position (e.g. as depicted at frame 5-I) and "k" comprises a spring constant. In general "F", and hence a rate of change of identifier from frame 5-1 to frame 5-II will be determined by "x" and "k", hence "k" is generally chosen to provide a transition from first position 401 to second position 403 which is aesthetically pleasing and/or below a given rate. For example, frames of the animation sequence can be provided at a given frame rate at display 124, and k can be chosen such that identifier 311 changes position by a less than a maximum distance in each frame such that the change of position of identifier 311 appears smooth to viewer of display 124.

In any event, at frame 5-I, spring 501 is in an equilibrium position. At frame 5-II, spring has been displaced by distance about equal to a distance between an initial position of object 310 and new position 402 of object 310; hence processor 120 determines a hypothetical force on identifier 311 and begins to smoothly transition identifier to second position 403. Frame 5-III depicts an intermediate position of identifier 311, with "x" being less than "x" in frame 5-II, and hence the hypothetical force on identifier 311 in frame 5-III is less than that in frame 5-II and a rate of change of position of identifier 311 is slower than in frame 5-II. At frame 5-IV, identifier 311 has come to a rest at second position 403.

It is further appreciated that processor 120 can be configured to begin transitioning identifier 311 once a new position of object 310 is determined (e.g. spring physics is not "turned on" until object 310 is a position for a given time period, such as a few seconds, and the like) and/or processor 120 can be configured to begin transitioning identifier 311 as soon as movement of object 310 is determined. In the latter, processor 120 is configured to move identifier 311 in electronic images 305 such that identifier appears to follow moving object 310.

In yet further implementations; processor 120 is further configured to use inertial physics to smoothly transition identifier 311 to second position 403. For example, attention is directed to FIG. 6, which depicts a given mode of application 150, and specifically frames 6-I, 6-II, 6-III, 6-IV, 6-V in an animation sequence, of which frames 6-I, 6-II, 6-III, 6-V are respectively similar frames 4-I, 4-II, 4-III, 4-IV of FIG. 4, with like elements having like numbers. However, frame 6-IV depicts an implementation and/or mode where transitioning identifier 311 overshoots second position 403, stops, and smoothly transitions back towards second position 403 before stopping at second position 403. In other words, in these implementations, processor 120 is configured to treat identifier 311 as if it had mass, and hence, momentum can cause identifier 311 to overshoot second position 403. A combination of spring physics and inertial physics, however, will cause identifier 311 to come to rest at second position 403. Indeed, processor 120 can be configured to use one or more of spring physics and inertial physics to smoothly transition identifier 311 to second position 403.

While animated smooth transitions of identifier 311 have been described with reference to spring physics and inertial physics, it is appreciated that any manner of smoothly transitioning identifier 311 from a first position to a second position is within the scope of present implementations.

Figure 6:
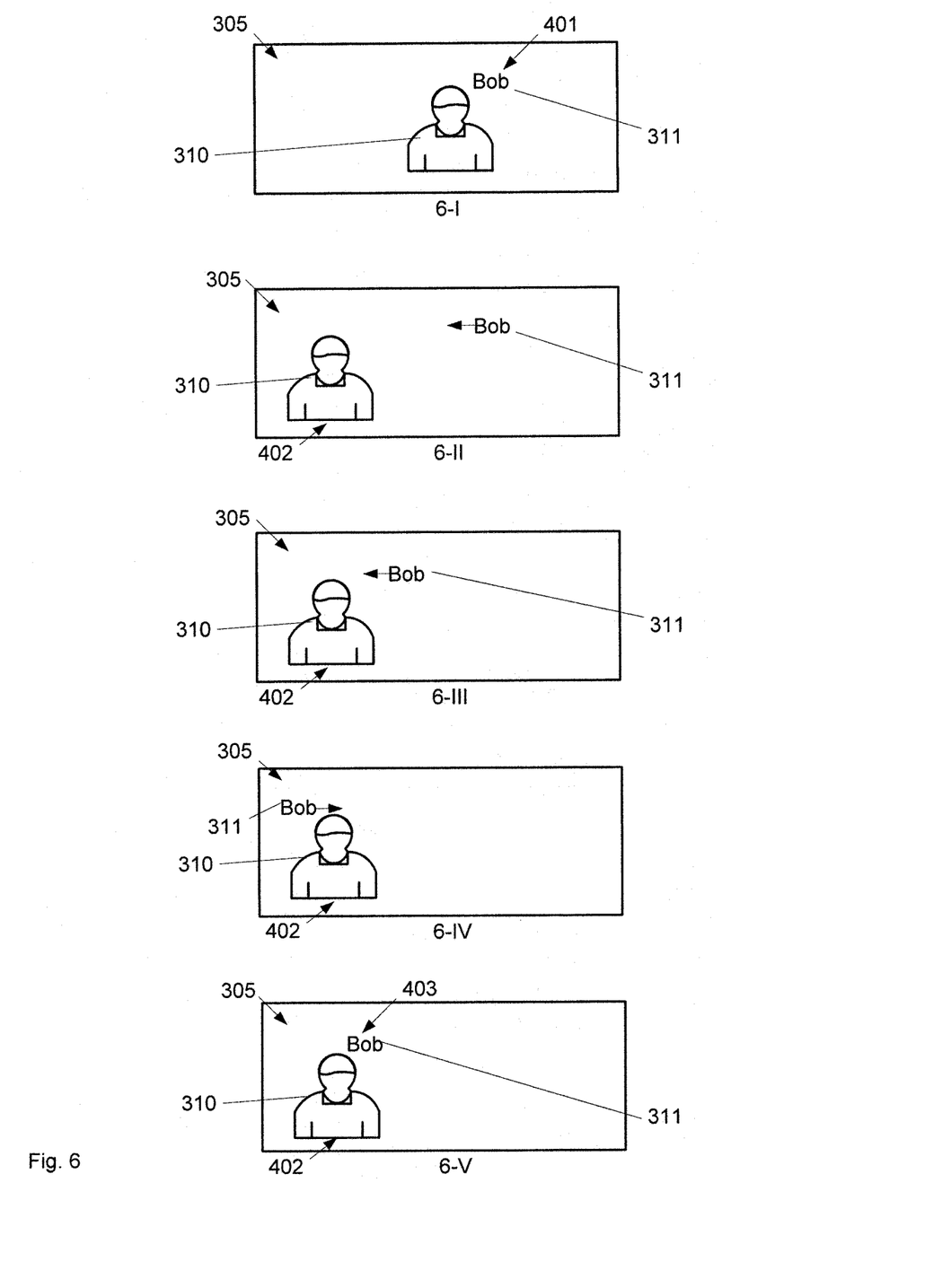
FIG. 6 depicts an animation sequence at a graphic user interface of an enhanced augmented reality application at the device of FIG. 1, where inertial physics is used to animate an identifier of an object, according to non-limiting implementations.

Attention is directed to FIG. 7, which depicts another given mode of application 150, and specifically frames 7-I, 7-II, 7-III, 7-IV, 7-V of an animation sequence which are respectively similar frames 6-I, 6-II, 6-III, 6-IV, 6-V of FIG. 6, with like elements having like numbers. However, in these implementations, an identifier 711 comprises a graphical identifier but otherwise processor 120 is configured to, when object 310 moves, smoothly transition identifier 711 from first position 401 to second position 403 at display 124 using animation. In other words, identifier 711 behaves similar to identifier 311 as described above. However, in these implementations and/or modes, identifier 711 comprises a pointer 713 to object 310, and processor 120 is further configured to move pointer 713 to point towards object 310 when object 310 moves. Further, pointer 713 continues to point towards object 310 as identifier 711 transitions to second position 403.

For example, at frame 7-I, pointer 310 is generally pointing towards a right side of object 310. At frame 7-II, as object 310 has moved to new position 402, identifier 711 has started to smoothly transition from first position 401 to second position 403, and further pointer 713 has smoothly rotated to point to object 310, for example the same place on object 310 as in frame 7-I. At frame 7-III, identifier 711 continues to smoothly transition to second position 403, and further pointer 713 continues to rotate to point to object 310, again the same place on object 310 as in frame 7-I.

At frame 7-IV, identifier 711 overshoots position 403 due to a combination of inertial physics and spring physics, as described above, however frame 7-IV is appreciated to be optional.

At frame 7-V, identifier 711 has smoothly transitioned to second position 403 and pointer 713 again points to the same place on object 310, as in frame 7-I. It is further appreciated that each of frames 7-I, 7-II, 7-III, 7-IV, 7-V represent frames in an animation sequence and that pointer 713 also smoothly transitions to point to object 310 using animation, as identifier 711 transitions from first position 401 to second position 403.

Attention is directed to FIG. 8, which depicts another given mode of application 150 in which object 310 moves out of a field of view of display 124 and/or out of electronic images 305; further, elements of FIG. 8 are similar to elements of FIG. 7, with like elements having like numbers. Specifically frames 8-I, 8-II, 8-III, 8-IV, 8-V depict frames in an animation sequence, similar to FIGS. 4 to 7, with frame 8-I being similar to frame 7-I.

At frame 8-II, object 310 is moving to a new position that is outside of a field of view of display 124 (e.g. out of a field of view of camera device 134) and/or out of electronic images 305. Indeed, at frame 8-II, a last position of object 310 in a field of view of display 124 and/or in electronic images 305 is appreciated to be at a left edge of electronic images 305. At frames 8-III to 8-V, object 310 has moved out of a field of view of display 124 and/or out of electronic images 305.

As further appreciated from frames 8-II to 8-IV, when object 310 moves out of the field of view of display 124 and/or electronic images 305, a second position 803 of identifier 311 is at an edge of display 124 proximal where object 310 moved out a field of view of display 124 and/or out of electronic images 305. Indeed, at frame 8-II, identifier 711 is depicted as smoothly transitioning towards object 310, and pointer 713 is smoothly transitioning to pointing towards object 310. At frame 8-III, object 310 has moved out of electronic images 305, and identifier 711 is smoothly transitioning to a second position 803 proximal where object 310 moved out of electronic images 305.

At frame 8-IV, identifier 711 has smoothly transitioned to second position 803 and, in these implementations, only a portion of identifier 711 is rendered at display 124, for example pointer 713 is now "off-screen" (however, in other implementations and/or modes, pointer 713 can be "on-screen"). Further, in frame 8-IV, second position 803 of identifier 711 indicates a position of object 310 when object 310 moved outside of a field of view of display 124.

In yet further implementations, pointer 713 can also move "off-screen" smoothly, as if following object 310.

In depicted implementations, identifier 711 is modified at frame 8-IV such that identifier 711 identifies a position of object 310, at least when object 310 moves out of a field of view of display 124 and/or out of electronic images 305; specifically identifier 711 now further comprises text "Object Moved Here", though it is appreciated providing such text is one or more of optional and configurable via application 150 (i.e. providing such text can be yet another mode of application 150). Alternatively, identifier 711 in frames 8-I to 8-V could comprise a textual identifier rather than a graphical identifier.

Alternatively, a position of object 310 can be tracked via object tracking device 121, such that a position of object 310 can be tracked when object 310 moves out a field of view of display 124. It is appreciated that, in these implementations, object tracking device 121 comprises apparatus for tracking object 310 outside a field of view of camera device 134. Processor 120 can hence be further configured to indicate a position of object 310 via identifier 711. For example, text of identifier 711 in frame 8-IV could be updated to indicate a position of object 310 (e.g. "Object is 2 meters right", and the like). In other words, identifier 711 identifies a position of object 310 outside of the field of view of display 124.

In some implementations and/or modes, identifier 711 can be removed from display 124 after a given time period, for example a few seconds, though the given time period can be configurable at application 150.

At frame 8-V, which depicts yet a further optional mode of application 150, object 310 and/or display 124 has moved such that object 310 is located at another position out of the field of view of display 124 and/or a field of view of camera device 134, for example to a right side of a field of view of display 124. In these implementations, tracking device 121 is used to track object 310 outside of the field of view of display 124, and identifier 711 can be smoothly transitioned to indicate a new position of object 310 out of the field of view of display 124.

For example, identifier 711 can smoothly transition from a position on a left side of display 124, as in frame 8-IV, and move to a right side of display 124; positions of identifier 711 depicted in outline in frame 8-V indicate intermediate positions of identifier 711. Indicator 711 again, optionally, comprises text indicative of a position of object 310 (e.g. "Object 2 meters right"), as determined via object tracking device 121.

In other words, in these implementations, processor 120 is further configured to: track object 310 when object 310 can no longer be rendered at display 124; and indicate a position of object 310 via identifier 311.

Persons skilled in the art will appreciate that there are yet more alternative implementations and modifications possible. For example, attention is next directed to FIG. 9 which depicts a heads-up display (HUD) device 101a, which is, schematically, substantially similar to device 101, with like elements having like numbers, but with a "a" appended thereto. Hence, HUD device 101a comprises: a processor 120a interconnected with an object tracking device 121a, a memory 122a, a display 124a, an input device 126a, and an optional communication interface 128a, an optional microphone 130a and an optional speaker 132a. Object tracking device 121a can further comprise a camera device, as in device 101, however object tracking device 121a is generally enabled to track a position of an object relative to HUD device 101a and/or display 124a. Further, memory 122a stores an application 150a similar to application 150. Processor 120a is configured to: render, at display 124a, an identifier of an object at a first position associated with the object, the object tracked using the object tracking device 121a; and, when the object moves, smoothly transition the identifier from the first position to a second position at display 124a using animation, the second position associated with a new position of the object.

Figure 9:
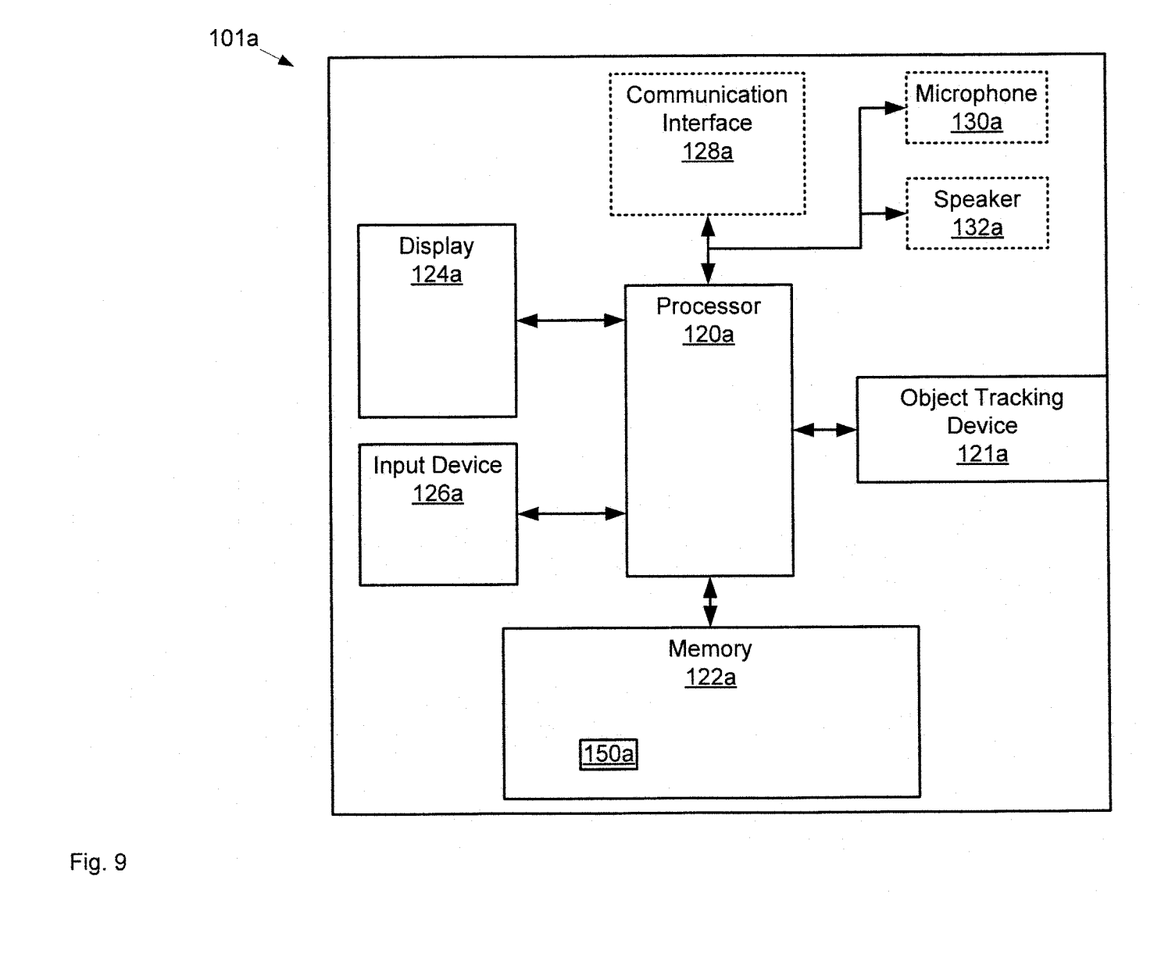
FIG. 9 depicts a schematic diagram of an alternate heads-up display (HUD) device with enhanced augmented reality functionality, according to non-limiting implementations.

However, in these implementations, display 124a comprises a transparent display of HUD device 101a, and the first position and the second position are associated with positions of the object in a field of view of the transparent display.

Figure 10:
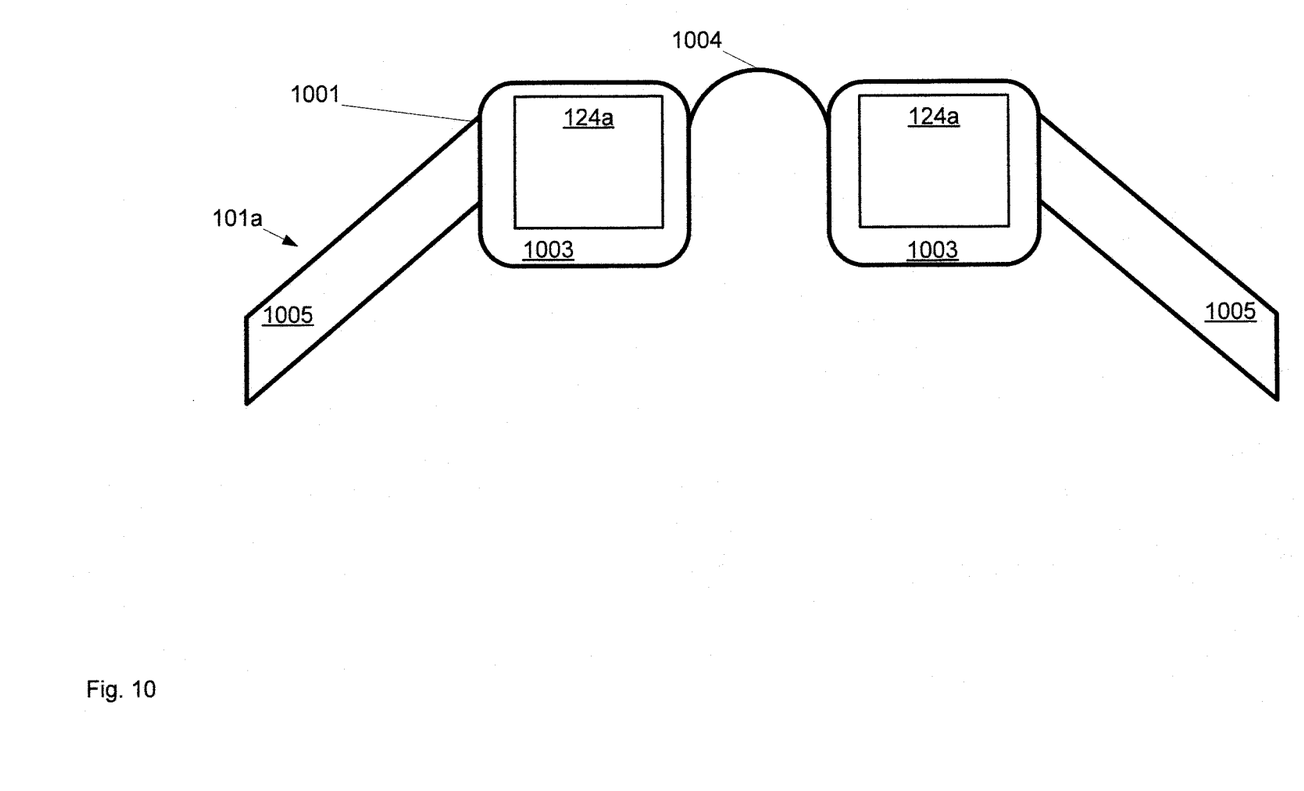
FIG. 10 depicts a perspective view of the HUD device of FIG. 9, according to non-limiting implementations.

For example, attention is next directed to FIG. 10, which depicts a perspective view of HUD device 101a. In these implementations, HUD device 101a comprises wearable glasses. "Wearable" is appreciated to mean wearable by a person/human being. Further, the term "wearable" is meant to convey that display 124a is viewable by one or more eyes of a human being when HUD device 101a is being worn. Further, the term "glasses" is not to be construed so narrowly as to include only devices having the form factor and/or functionality of corrective glasses and/or sunglasses. For example the HUD device 101a need not have either vision correction functionality and/or sunglasses functionality, though, in some implementations, the wearable glasses can have one or more of vision correction functionality and sunglasses functionality. Further, HUD device 101a need not have two lenses, a nosepiece and ear pieces as with corrective glasses; rather, in these implementations, HUD device 101a can comprise glasses, a visor, a helmet, a headpiece, and the like, as long as display 124a is viewable by a user.

Further, HUD device 101a need not be wearable. For example, HUD device 101a could be incorporated into a windshield of a vehicle, including, but not limited to a motor vehicle, a car, a military vehicle, a tank, an aircraft, and the like.

In any event, in these implementations HUD device 101a comprises a frame 1001, lenses 1003, a nosepiece 1004 there between, and earpieces 1005. It is further appreciated that while two lenses 1003 are depicted, one for each of a left eye and right eye, in other implementations HUD device 101a comprises only one lens 1003 (i.e. one lens 1003 for one of a left eye or a right eye, or one wraparound lens/visor for both eyes). Further, in these implementations, display 124a comprises two portions, one for each lens 1003 such that display 124a is viewable by both eyes of a wearer of HUD device 101a; further, in these implementations, display 124a comprises a transparent display integrated into each lens 1003. It is appreciated that, in the implementations, the term "transparent" is not meant to mean 100% transparent; rather, the transparent display is generally appreciated to be at least semi-transparent such that objects in a field of view of display 124a can be viewed through display 124a.

In other implementations, only one of lenses 1003 can comprise display 124a. In yet further implementations, display 124a need not be built into a lens 1003 but can be located in front of and/or behind one or more of lenses 1003 and/or be enabled to be moveable relative to a lens 1003 such that display 124*a* is viewable when HUD device 101*a* is worn by a user.

Further, while not depicted, it is appreciated that a processor 120*a*, object tracking device 121*a*, memory 122*a*, input device 126*a*, optional communication interface 128*a*, optional microphone 130*a* and optional speaker 132*a* are integrated into, for example, one or more of frame 1001, nosepiece 1004, and earpieces 1005.

In any event, it should be understood that a wide variety of configurations for HUD device 101*a* are contemplated.

It is further appreciated that display 124*a* does not render objects tracked by object tracking device 121*a*. Rather, objects are viewable through lenses 1003 and through display 124*a*.

Figure 11:
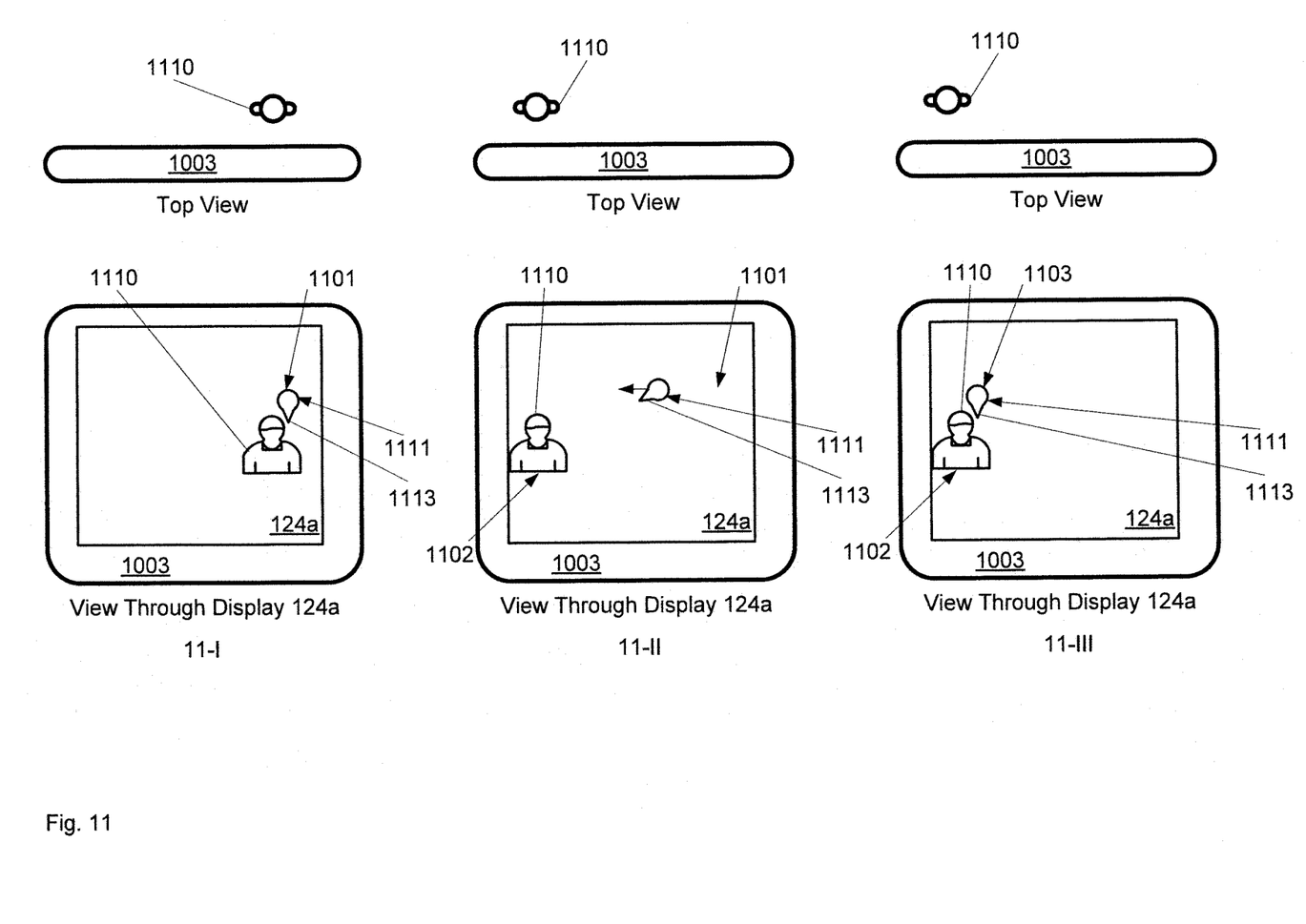
FIG. 11 depicts an animation sequence at a graphic user interface of an enhanced augmented reality application at the HUD device of FIG. 9, and a top view of a lens of the HUD device and a tracked object, according to non-limiting implementations.

For example, attention is directed to FIG. 11 which depicts frames 11-I, 11-II, 11-III, of an animation sequence which are respectively similar frames 7-I, 7-II, 7-V of FIG. 7. For clarity, each frame 11-I, 11-II, 11-III depicts one lens 1003 and its associated portion of display 124*a*; while not depicted, it is assumed that the remaining elements of HUD device 101*a* (i.e. frame 1001, the other lens 1003 (and the other portion of display 124*a*), nosepiece 1004, earpieces 1005) are nonetheless present. Further, each frame 11-I, 11-II, 11-III is depicted with a top view of the associated lens 1003 and an object 1110 moving in a field of view of display 124*a*. It is appreciated that an electronic image of object 1110 is not rendered at display 124*a*, but that object 1110 is viewable through display 124*a*.

Each frame 11-I, 11-II, 11-III further comprises an identifier 1111, comprising a pointer 1113, each respectively similar to identifier 711 and pointer 713.

In any event, in these implementations, processor 120 is configured to smoothly transition identifier 1111 from a first position 1101 to a second position 1103 at display 124*a* using animation. Processor 120 is further configured to move pointer 1113 to point towards object 1110 when object 1110 moves to a new position 1102. Further, pointer 1113 continues to point towards object 1110 as identifier 1111 transitions to second position 1103. In other words, identifier 1111 behaves similar to identifiers 711, as described above.

For example, at frame 11-I, pointer 1113 is generally pointing towards a right side of object 1110. At frame 11-II, as object 1110 has moved to new position 1102, as appreciated both by the view through display 124*a* and from the top view of lens 1003 and object 1110; further, identifier 1111 has started to smoothly transition from first position 1101 to second position 1103, as indicated by the arrow in view 11-II, and pointer 1113 has smoothly rotated to point to object 1110, for example the same place on object 1110 as in frame 11-I. At frame 11-V, identifier 1111 has smoothly transitioned to second position 1103 and pointer 1113 again points to the same place on object 1110, as in frame 11-I. It is further appreciated that each of frames 11-I, 11-II, 11-III represent frames in an animation sequence and that pointer 1113 also smoothly transitions to point to object 1110 using animation, as identifier 1111 transitions from first position 1101 to second position 1103.

It is further appreciated that while identifier 1111 is graphical, identifier 1111 could be textual, similar to identifier 311, and/or a combination. Further, identifier 1111 could transition using one or more of spring physic and inertial physics, as described above. Identifier 1111 could further transition to an edge of display 124*a* when object 1110 move outside of a field of view of display 124*a*. Indeed, any behaviour heretofore described for identifiers 311, 711 can also be applied to identifier 1111.

In any event, by smoothly transitioning an augmented reality identifier of an object from a first position to a second position using animation, the identifier is prevented from jumping around within a display where an augmented reality application is being rendered. Such jumping around can be due to one or more of the object moving relative to the display and the display moving relative to the object; indeed, when the display is an element of a HUD device and/or a augmented reality glasses, even small movements of a user's head can cause large jumps in positions of objects in a field of view of the display. Regardless of the reasons for the object movement, when processing resources at a device are limited, a new position of an object can take time to determine: when an initial position of an object is lost, the identifier can simply be removed, only to reappear again when a new position of the object is identified. In present implementations, the identifier persists at a first position (i.e. relative to an initial position of the object) and when the new position of the object is determined, the identifier smoothly transitions from the first position to the second position using animation.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
a processor, an object tracking device and a display;
the processor configured to:
render, at the display, an identifier of an object at a first position associated with the object, the object tracked using the object tracking device; and,
when the object moves, smoothly transition the identifier from the first position to a second position at the display using animation, the second position associated with a new position of the object, the identifier following the object in the display using the animation and one or more of spring physics and inertial physics to smoothly transition the identifier to the second position during the animation, the identifier comprising a pointer to the object, the pointer moved to point towards the object when the object and the display move relative to each other, the pointer continuing to point towards the object as the identifier transitions to the second position, wherein when a property of the identifier exceeds a threshold the identifier smoothly transitions from the first position past the second position to a third position before the identifier returns to the second position.

2. The device of claim 1, wherein the processor is further configured to render, at the display, the identifier at one or more of proximal to a position associated with the object, on the position associated with the object, above the position associated with the object, below the position associated with the object, beside the position associated with the object and floating by the position associated with the object.

3. The device of claim 1, wherein, when the new position of the object is outside of a field of view of the display, the second position is at an edge of the display proximal where the object moved out of the field of view.

4. The device of claim 3, wherein the identifier one or more of:
is removed from the display after a given time period; and
identifies a position of the object outside of the field of view of the display.

5. The device of claim 1, wherein the processor is further configured to:
track the object when the object can no longer be rendered at the display; and
indicate a position of the object via the identifier.

6. The device of claim 1, wherein the object tracking device comprises a camera for capturing electronic images of the object and the processor is further configured to render an image of the object in the electronic images along with the identifier of the object.

7. The device of claim 1, further comprising a heads-up display (HUD) device, wherein the display comprises a transparent display of the HUD device, and the first position and the second position are associated with positions of the object in a field of view of the transparent display.

8. A method comprising:
rendering, at a display of a device, an identifier of an object at a first position associated with the object, the object tracked using an object tracking device and;
when the object moves, smoothly transitioning, using a processor of the device, the identifier from the first position to a second position at the display using animation, the second position associated with a new position of the object, the identifier following the object in the display using the animation and one or more of spring physics and inertial physics to smoothly transition the identifier to the second position during the animation, the identifier comprising a pointer to the object, the pointer moved to point towards the object when the object and the display move relative to each other, the pointer continuing to point towards the object as the identifier transitions to the second position, wherein when a property of the identifier exceeds a threshold the identifier smoothly transitions from the first position past the second position to a third position before the identifier returns to the second position.

9. The method of claim 8, further comprising rendering, at the display, the identifier at one or more of proximal to a position associated with the object, on the position associated with the object, above the position associated with the object, below the position associated with the object, beside the position associated with the object and floating by the position associated with the object.

10. The method of claim 8, wherein, when the new position of the object is outside of a field of view of the display, the second position is at an edge of the display proximal where the object moved out of the field of view.

11. The method of claim 10, wherein the identifier one or more of:
is removed from the display after a given time period; and
identifies a position of the object outside of the field of view of the display.

12. The method of claim 8, further comprising: tracking the object when the object can no longer be rendered at the display; and indicating a position of the object via the identifier.

13. The method of claim 8, wherein the object tracking device comprises a camera for capturing electronic images of the object and the method further comprises rendering an image of the object in the electronic images along with the identifier of the object.

14. The method of claim 8, wherein the display comprises a transparent display of a heads-up display (HUD) device, and the first position and the second position are associated with positions of the object in a field of view of the transparent display.

15. A non-transitory computer readable medium storing a computer program, wherein execution of the computer program is for:
rendering, at a display of a device, an identifier of an object at a first position associated with the object, the object tracked using an object tracking device; and,
when the object moves, smoothly transitioning, using a processor of the device, the identifier from the first position to a second position at the display using animation, the second position associated with a new position of the object, the identifier following the object in the display using the animation and one or more of spring physics and inertial physics to smoothly transition the identifier to the second position during the animation, the identifier comprising a pointer to the object, the pointer moved to point towards the object when the object and the display move relative to each other, the pointer continuing to point towards the object as the identifier transitions to the second position, wherein when a property of the identifier exceeds a threshold the identifier smoothly transitions from the first position past the second position to a third position before the identifier returns to the second position.

* * * * *